United States Patent
Meier et al.

(10) Patent No.: US 10,560,698 B2
(45) Date of Patent: *Feb. 11, 2020

(54) GRAPHICS SERVER AND METHOD FOR STREAMING RENDERED CONTENT VIA A REMOTE GRAPHICS PROCESSING SERVICE

(71) Applicant: Nvidia Corporation, Santa Clara, CA (US)

(72) Inventors: Thomas Meier, Santa Clara, CA (US); Chong Zhang, Sunnyvale, CA (US); Bhanu Murthy, Bangalore (IN); Sharad Gupta, Bangalore (IN); Karthik Vijayan, Bangalore (IN)

(73) Assignee: Nvidia Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/181,696

(22) Filed: Nov. 6, 2018

(65) Prior Publication Data
US 2019/0075297 A1 Mar. 7, 2019

Related U.S. Application Data

(63) Continuation of application No. 13/923,482, filed on Jun. 21, 2013, now Pat. No. 10,154,265.

(51) Int. Cl.
*G09G 5/00* (2006.01)
*H04N 19/137* (2014.01)
(Continued)

(52) U.S. Cl.
CPC .......... *H04N 19/137* (2014.11); *H04N 19/12* (2014.11); *H04N 19/176* (2014.11); *H04N 19/132* (2014.11)

(58) Field of Classification Search
CPC .............. G06F 2200/1614; G06F 3/14; G09G 2340/0492; G09G 2360/144; G09G 5/363
(Continued)

(56) References Cited

U.S. PATENT DOCUMENTS 6,952,215 B1   10/2005   Devins et al.
8,429,699 B2 *  4/2013   Rodriguez ....... H04N 21/25808
                                                    345/501
(Continued)

FOREIGN PATENT DOCUMENTS

CN   102638658 A   8/2012
TW   I383683 B    1/2013

*Primary Examiner* — Gordon G Liu

(57) ABSTRACT

A graphics server and method for streaming rendered content via a remote graphics rendering service is provided. In one embodiment, the server includes a memory, a graphics renderer, a frame capturer, an encoder, and a processor. The memory is configured to store a pre-computed skip-frame message indicative to a client to re-use a previously transmitted frame of the video stream. The graphics renderer is configured to identify when rendered content has not changed. When the graphics renderer identifies that the rendered content has not changed, the processor is configured to cause: (1) the frame capturer to not capture the frames of the rendered content; (2) the encoder to not encode the frames of the rendered content; and (3) the pre-encoded skip-frame message to be transmitted without requiring any pixel processing.

14 Claims, 2 Drawing Sheets

(51) Int. Cl.
*H04N 19/176* (2014.01)
*H04N 19/12* (2014.01)
*H04N 19/132* (2014.01)

(58) Field of Classification Search
USPC .................................................. 345/649, 240
See application file for complete search history.

(56) References Cited

U.S. PATENT DOCUMENTS

2010/0027663 A1* 2/2010 Dai ...................... H04N 19/159
 375/240.16
2010/0111410 A1 5/2010 Lu et al.
2010/0290528 A1 11/2010 Chengalvala et al.
2012/0057636 A1* 3/2012 Tian ....................... H04N 7/147
 375/240.24

* cited by examiner

GRAPHICS SERVER AND METHOD FOR STREAMING RENDERED CONTENT VIA A REMOTE GRAPHICS PROCESSING SERVICE

CROSS-REFERENCE TO RELATED APPLICATION

This application is a continuation of U.S. patent application Ser. No. 13/923,482, entitled "GRAPHICS SERVER AND METHOD FOR STREAMING RENDERED CONTENT VIA A REMOTE GRAPHICS PROCESSING SERVICE", filed on Jun. 21, 2013. The above-listed application commonly assigned with the present application is incorporated herein by reference as if reproduced herein in its entirety.

TECHNICAL FIELD

This application is directed, in general, to computer graphics processing and, more specifically, to power, memory and time efficient remote rendering, frame capture and encoding.

BACKGROUND

The utility of personal computing was originally focused at an enterprise level, putting powerful tools on the desktops of researchers, engineers, analysts and typists. That utility has evolved from mere number-crunching and word processing to highly programmable, interactive workpieces capable of production level and real-time graphics rendering for incredibly detailed computer aided design, drafting and visualization. Personal computing has more recently evolved into a key role as a media and gaming outlet, fueled by the development of mobile computing. Personal computing is no longer resigned to the world's desktops, or even laptops. Robust networks and the miniaturization of computing power have enabled mobile devices, such as cellular phones and tablet computers, to carve large swaths out of the personal computing market.

Mobile computing has transformed conventional notions of information accessibility and media dissemination. Network enabled devices are the new norm, connecting a wide variety of devices over a variety of networks. This has led to a proliferation of conventional, or "mainstream" content, as well as non-conventional, amateur, or home-made content. Going forward, not only will this content be available on virtually any mobile device, in addition to conventional outlets, but mobile devices can play the role of a media hub, gaining access to a plethora of content and forwarding it, or "pushing it out," to one or more display devices, including televisions, computer monitors, projectors, or any device capable of receiving, decoding, and displaying streamed content. While typically thought of as clients, mobile devices, and more generally, virtually any computing device can play the role of a "media server."

In a typical server-client remote graphics processing arrangement, graphics content is stored, retrieved, and rendered on a server. Frames of rendered content are then captured and encoded, generally at a frame rate that is either specified by a managing device or is simply part of a configuration. Captured and encoded frames are then packetized and transmitted over a network to a client as a video stream (often including audio). The client simply decodes the video stream and displays the content. Such a "thin-client" application can be easily portable to a variety of platforms.

As mobile computing continues to evolve with the growing focus on content accessibility and dissemination, the role of mobile devices will continue to expand. Typical client server boundaries will continue to fade and more people will rely on mobile devices as their client and server, depending on the content of interest.

SUMMARY

One aspect provides a graphics server. In one embodiment, the server includes: (1) a graphics renderer; (2) a frame capturer; (3) an encoder; and (4) a processor. The graphics renderer is configured to identify when rendered content has not changed. When the graphics renderer identifies that rendered content has not changed, the processor is configured to cause: (1) the frame capturer to not capture frames of the rendered content; (2) the encoder to not encode the frames of the rendered content; and (3) cause a pre-encoded skip-frame message to be transmitted without requiring any pixel processing.

Another aspect provides a method of streaming rendered content via a remote graphics processing service. The method comprises when identifying the rendered content has not changed causing: (1) a frame capturer to not capture the frames of the rendered content; (2) an encoder to not encode the frames of the rendered content; and (3) a pre-encoded skip-frame message to be transmitted without requiring any pixel processing.

Yet another aspect provides a graphics server for streaming rendered content of a video stream. In one embodiment, the server includes a memory, a graphics renderer, a frame capturer, an encoder, and a processor. The memory is configured to store a pre-computed skip-frame message indicative to a client to re-use a previously transmitted frame of the video stream. The graphics renderer is configured to identify when rendered content has not changed. When the graphics renderer identifies that the rendered content has not changed, the processor is configured to cause: (1) the frame capturer to not capture the frames of the rendered content; (2) the encoder to not encode the frames of the rendered content; and (3) the pre-encoded skip-frame message to be transmitted without requiring any pixel processing.

BRIEF DESCRIPTION OF THE DRAWINGS

Reference is now made to the following descriptions taken in conjunction with the accompanying drawings, in which.

DETAILED DESCRIPTION

Figure 1:
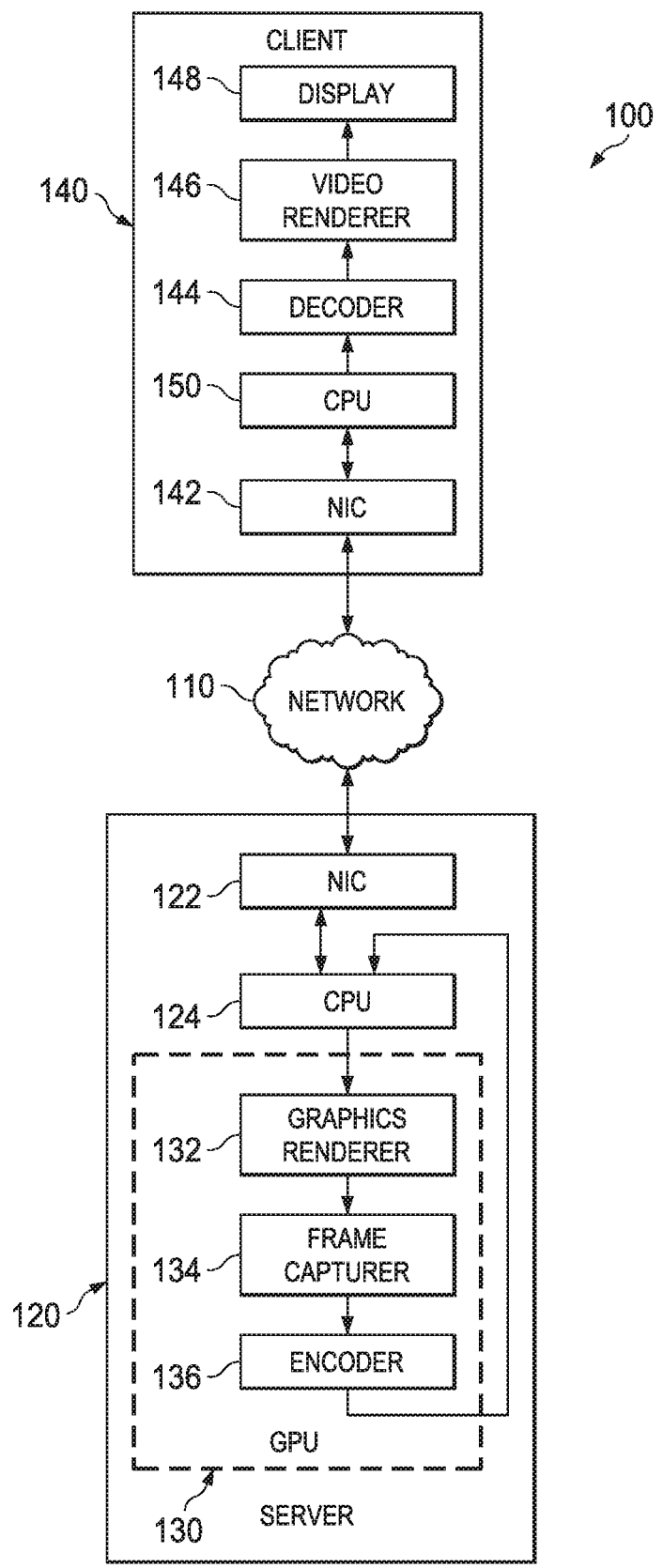
FIG. 1 is a block diagram of one embodiment of a server-client remote graphics processing system.

As the role of media server opens up to a growing variety of computing devices, limitations arise that were previously dismissed under conventional server-client regimes. Conventional servers are centrally located, plug into the wall for power and typically rely on externally provided network access, cooling and possibly storage. While such an arrangement is not immune to power, memory or latency restrictions, these restrictions are much more prevalent in mobile devices in a server role.

Mobile devices, which include smart phones, tablets, laptop PCs and others, generally rely on battery power to some extent. Many mobile devices are also limited to a built in memory, or are at most expanded by some form of removable media, such as SD Flash or MicroSD cards. Having those limitations in mind, mobile device manufacturers and software developers are careful to not introduce unnecessary processes or memory caches. Considering a mobile device in a server role, even modest efficiencies in power consumption, memory bandwidth and latency can become critical.

It is realized herein the capture and encode stages of remote graphics processing can be bypassed when rendering is idle and the rendered content is unchanged. On a graphics server, processing is typically divided between a central processing unit (CPU) and a graphics processing unit (GPU). The GPU carries out rendering tasks and frame capture, and in some cases encoding. The CPU executes an application, generating scene data and rendering commands, or can recall content from memory and direct it to the GPU for rendering. Additionally, the CPU processes captured and encoded frames to prepare them for transmission to the client. In some embodiments, the CPU manages the operation of the rendering, capture and encode stages either by enabling and disabling, clock frequency scaling, or some other mechanism. By detecting when rendered content is unchanged, the capture and encode stages can be disabled or at least their operation slowed to a rate more comparable with the content update rate. It is further realized herein that this can be accomplished by maintaining a control bit that, when set, indicates new content has been rendered. The control bit can be maintained by the rendering stage and read by the capture and encode stages, or the control bit can be maintained by the CPU, which would manage the operation of the capture and encode stages based on the control bit.

It is realized herein that by bypassing capture and encode, costly memory read/write cycles are forgone along with the processing cycles required for encoding. These savings reduce power consumption, memory bandwidth consumption, and latency.

Although the server has bypassed unnecessary processes, the client still requires frames be displayed at the specified frame rate. It is realized herein that a skip-frame message can be transmitted in lieu of a captured and encoded frame. The skip-frame message is typically built in to whatever encoding scheme is employed for the streaming. For instance, the h.264 standard provides a protocol to instruct a client to re-use the previously received and decoded frame. That is to say, keep displaying the current frame, the rendered content has not changed. It is further realized herein this skip-frame message can be pre-computed independent of the render, capture, and encode stages. For example, the CPU can pre-compute an h.264 skip-frame message and simply transmit it whenever the control bit indicates and the capture and encode stages are bypassed.

It is also realized herein the efficiencies gained when rendered content is unchanged, can also be had when rendered content is new, but well known. In those cases, capture, and encode can be bypassed so long as an efficient coding pattern can be pre-computed in place of a captured and encoded frame. It is further realized herein the efficiencies may be most valuable when a mobile device is the server, but are just as applicable to conventional, centralized server arrangements. The scale of such arrangements could reach a point that it would justify modest gains in power and memory efficiency on a per-client level.

Before describing various embodiments of the graphics server and method of streaming rendered content introduced herein, a server-client remote graphics processing system within which the graphics server and method may be embodied or carried out will be described.

FIG. 1 is a block diagram of one embodiment of a server-client remote graphics processing system 100. System 100 includes a network 110 through which a server 120 and a client 140 communicate. Server 120 represents the central repository of content, processing, and rendering resources. Client 140 is a consumer of that content and those resources. In certain embodiments, server 120 is freely scalable and has the capacity to provide that content and those services to many clients simultaneously by leveraging parallel and apportioned processing and rendering resources. In addition to any limitations on the power, memory bandwidth, or latency of server 120, the scalability of server 120 is limited by the capacity of network 110 in that above some threshold of number of clients, scarcity of network bandwidth requires that service to all clients degrade on average.

Server 120 includes a network interface card (NIC) 122, a central processing unit (CPU) 124, and a GPU 130. Upon an election on server 120, or in certain embodiments, upon request from client 140, graphics content is recalled from memory via an application executing on CPU 124. As is convention for graphics applications, games for instance, CPU 124 reserves itself for carrying out high-level operations, such as determining position, motion, and collision of objects in a given scene. From these high level operations, CPU 124 generates rendering commands that, when combined with the scene data, can be carried out by GPU 130. For example, rendering commands and data can define scene geometry, lighting, shading, texturing, motion, and camera parameters for a scene.

GPU 130 includes a graphics renderer 132, a frame capturer 134, and an encoder 136. Graphics renderer 132 executes rendering procedures according to the rendering commands generated by CPU 124, yielding a stream of frames of video for the scene. Those raw video frames are captured by frame capturer 134 and encoded by encoder 136. Encoder 134 formats the raw video stream for transmission, possibly employing a video compression algorithm such as the H.264 standard arrived at by the International Telecommunication Union Telecommunication Standardization Sector (ITU-T) or the MPEG-4 Advanced Video Coding (AVC) standard from the International Organization for Standardization/International Electrotechnical Commission (ISO/IEC). Alternatively, the video stream may be encoded into Windows Media Video® (WMV) format, VP8 format, or any other video encoding format.

CPU 124 prepares the encoded video stream for transmission, which is passed along to NIC 122. NIC 122 includes circuitry necessary for communicating over network 110 via a networking protocol such as Ethernet, Wi-Fi, or Internet Protocol (IP). NIC 122 provides the physical layer and the basis for the software layer of server 120's network interface.

Client 140 receives the transmitted video stream for display. Client 140 can be a variety of personal computing devices, including: a desktop or laptop personal computer, a tablet, a smart phone, or a television. Client 140 includes a NIC 142, a decoder 144, a video renderer 146, a display 148, and a CPU 150. NIC 142, similar to NIC 122, includes circuitry necessary for communicating over network 110 and provides the physical layer and the basis for the software layer of client 140's network interface. The transmitted video stream is received by client 140 through NIC 142. CPU 150 unpacks the received video stream and prepares it for decoding.

The video stream is then decoded by decoder 144. Decoder 144 should match encoder 136, in that each should employ the same formatting or compression scheme. For instance, if encoder 136 employs the ITU-T H.264 standard, so should decoder 144. Decoding may be carried out by either a client CPU or a client GPU, depending on the physical client device. Once decoded, all that remains in the video stream are the raw rendered frames. The rendered frames are processed by a basic video renderer 146, as is done for any other streaming media. The rendered video can then be displayed on display 148.

Having described a server-client remote graphics processing system within which the graphics server and method for streaming rendered content may be embodied or carried out, various embodiments of the graphics server and method will be described.

Figure 2:
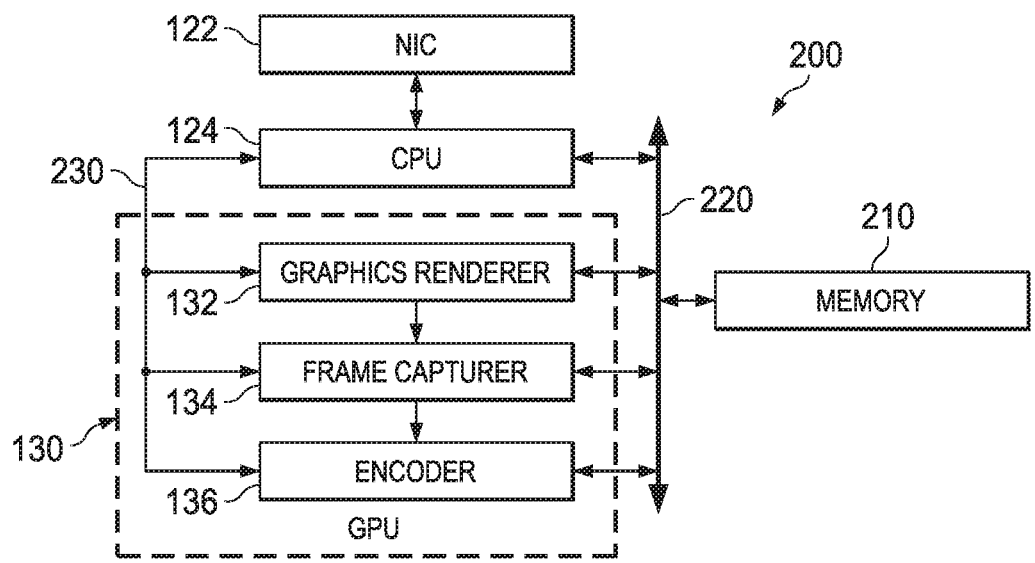
FIG. 2 is a block diagram of one embodiment of a graphics server.

FIG. 2 is a block diagram of one embodiment of a graphics server 200, such as server 120 of FIG. 1. Graphics server 200 includes NIC 122, CPU 124, and GPU 130, all of FIG. 1. Additionally, graphics server 200 includes a memory 210, a data bus 220, and a control bus 230. GPU 130 includes graphics renderer 132, frame capturer 134, and encoder 136, also of FIG. 1.

As in server 120 of FIG. 1, basic operation of graphics server 200 includes rendering content, capturing frames, and encoding frames for subsequent transmission to a client. CPU 124, graphics renderer 132, frame capturer 134, and encoder 136 all read and write to memory 210 via data bus 220. Data bus 220 is the primary avenue for moving content through the render, capture, and encode process. Data bus 220 can be used to move data directly from processing unit to processing unit, but more often than not, for large amounts of data, data is moved from a processing unit, over data bus 220 and into memory 210. Once in memory, access to the data can be had by any processing unit attached to data bus 220. CPU 124 manages the operation of graphics renderer 132, frame capturer 134, and encoder 136 via control bus 230.

CPU 124 executes an application by which it generates rendering commands and either generates, or recalls from memory, scene data for rendering. Typically, scene data is stored in memory 210 and used later during rendering. Graphics renderer 132 gains access to the scene data in memory 210 via data bus 220 and carries out the rendering commands on the scene data to produce rendered content. Rendered content is moved into memory 210 via data bus 220. Graphics renderer 132 generally only renders when "on-screen" content has changed. There are numerous methods available for conserving rendering resources when content is unchanged. When rendered content is at least partially changed, a control signal, or control bit, is set.

Frame capturer 134 and encoder 136 are configured to operate at a frame rate specified by CPU 124. The frame rate is often the result of a user setting, a quality-of-service (QoS) process, a negotiation between server 200 and the client, or some other configuration. Not only is the frame rate the rate at which frames of rendered content are captured and encoded, but also transmitted, and likely decoded and displayed. Such an arrangement is sensitive to latency and sub-optimal network conditions. Frame capturer 134 "captures" rendered content by periodically copying the rendered content into a staging buffer in memory 210. In certain embodiments, the control bit is set when new rendered content is submitted to the capture stage. Once captured, the control bit is cleared. If when frame capturer 134 goes to copy rendered content, the control bit is cleared, frame capturer knows the rendered content is unchanged since the last capture. In the embodiment of FIG. 2, CPU 124 maintains the control bit. When graphics renderer 132 produces new rendered content, the control bit is set. CPU 124 then uses the control bit to enable and disable frame capturer 134 and encoder 136 via control bus 230. Alternatively, CPU 124 can use clock frequency scaling based on the control bit to manage the rate at which frame capturer 134 and encoder 136 operate. Clock frequency scaling allows a clocked device to be sped up and slowed down according to its work load and work capacity. In this case, CPU 124 can reduce the rate at which frame capturer 134 operates, such that no frames are captured unless the rendered content is at least partially changed. This bypass of the frame capture stage reduces the consumption of power and memory bandwidth by eliminating unnecessary read and write cycles.

Encoder 136 gains access to the staging buffer in memory 210 via data bus 220 and encodes the stored frame. For example, many video streaming implementations use h.264 encoding. The encoded frame is then written to a frame buffer in memory 210 via data bus 220. Similar to frame capturer 134, operation of encoder 136 is managed by CPU 124 over control bus 230. CPU 124 reduces the rate at which encoder 136 operates based on the control bit. If the control bit is set, the rendered content is at least partially changed and new data has been written to the staging buffer in memory 210. If the control bit is clear, the rendered content is unchanged and new data has not been written to the staging buffer in memory 210. The encode stage is bypassed, which reduces power consumption by eliminating unnecessary processing.

CPU 124 retrieves encoded frames from memory 210 via data bus 220 and prepares, or "packs" them for transmission via NIC 122. This preparation typically involves packetizing the data from the frame buffer and possibly additional encoding for the transmission protocol. When the capture and encode stages are bypassed, as indicated by the control bit via control bus 230, no new frame is ready for packing and transmission. Instead, a skip-frame message is transmitted to the client. The skip-frame message indicates to the client that no update is needed and the client should continue displaying, or using, the previous frame. The client maintains its frame rate regardless of whether content is changing, being rendered, captured, and encoded. The skip-frame message is generally built into the encoding scheme, for example, an h.264 skip frame message. The skip-frame message is a fixed message and can be pre-computed by CPU 124 before rendering time and stored in memory 210. Once computed, CPU 124 can have the skip-frame message re-transmitted via NIC 122 whenever on-screen content is idle or unchanged.

Figure 3:
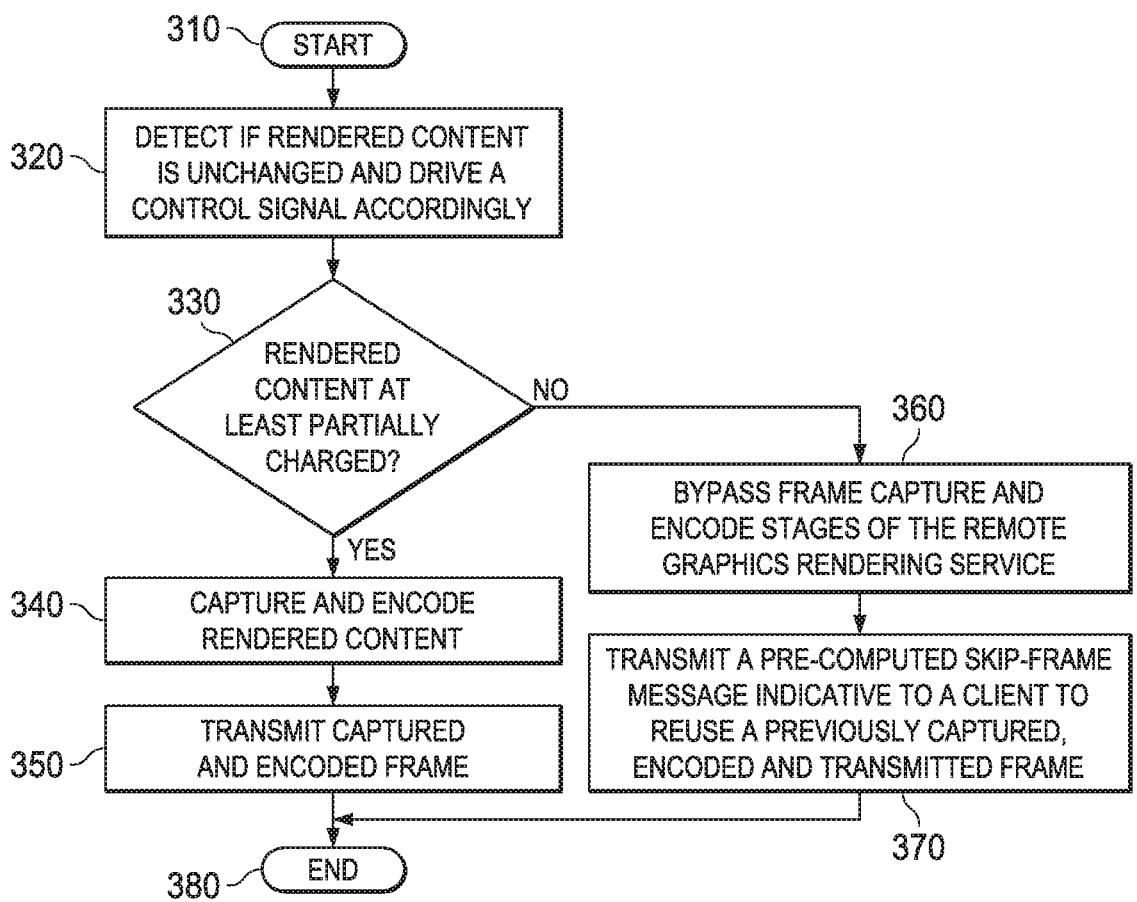
FIG. 3 is a flow diagram of one embodiment of a method for streaming rendered content via a remote graphics processing service.

FIG. 3 is a flow diagram of one embodiment of a method for streaming rendered content via a remote graphics processing service. The method begins in a start step 310. A determination is made, in a detection step 320, as to whether the rendered content is unchanged. According to that determination, a control signal is driven. In certain embodiments, the control signal is a control bit, which could be embedded in a control message or form its own message. The control signal may also be an independent signal distributed to one or more processing devices. In a decision step 330, a decision is made based on the control signal from detection step 320. If the control signal indicates the rendered content has at least partially changed, then the method proceeds to a capture and encode step 340 and a transmit frame step 350. If the control signal indicates the rendered content is unchanged, then the method proceeds to a bypass step 360 and a transmit skip-frame step 370.

In alternate embodiments, the rendered content may be partially changed, but the rendered content is well known and an efficient coding pattern can be pre-computed to represent it. In that case, in those alternate embodiments, the method would proceed to bypass step 360. Rather than proceeding to transmit skip-frame step 370, the pre-computed frame is transmitted. This reduces power consumption, memory bandwidth and latency normally experienced during capture and encode.

Continuing the embodiment of FIG. 3, when the rendered content is at least partially changed, frames of the rendered content are captured and encoded at capture and encode step 340. Frame capture typically occurs at a specified frame rate. Encoding follows suit, encoding captured frames at the specified frame rate. At transmit frame step 350, the captured and encoded frame is transmitted toward a client, which expects frames at the specified frame rate. The method then ends in an end step 380.

When the rendered content is unchanged, rendering is idle and new rendered content is not submitted to the capture and encode stages. The capture and encode stages are bypassed at bypass step 360. Then, at transmit skip frame step 370, a pre-computed skip-frame message is transmitted toward the client. When the client receives the skip-frame message, the client interprets it as an instruction to continue displaying, or re-use the previous captured and encoded frame. The skip-frame message can be stored in memory, computed at start-up, at scene-load time, or any other time before rendering, capturing, and encoding. The method then ends at step 380.

Those skilled in the art to which this application relates will appreciate that other and further additions, deletions, substitutions and modifications may be made to the described embodiments.

What is claimed is:

1. A graphics server, comprising:
   a graphics renderer configured to identify when rendered content has not changed;
   a frame capturer;
   an encoder; and
   a processor, wherein when said graphics renderer identifies said rendered content has not changed said processor is configured to:
      cause said frame capturer to not capture said frames of said rendered content;
      cause said encoder to not encode said frames of said rendered content; and
      cause a pre-encoded skip-frame message to be transmitted without requiring any pixel processing.

2. The graphics server recited in claim 1 wherein said graphics server is a mobile computing device.

3. The graphics server recited in claim 1 wherein said graphics renderer, frame capturer, and encoder are contained within a graphics processing unit (GPU) communicably coupled to said processor.

4. The graphics server recited in claim 1 wherein said encoder is a hardware ITU-T H.264 encoder.

5. The graphics server recited in claim 1 wherein said skip-frame message is a pre-computed ITU-T H.264 skip message.

6. A method of streaming rendered content via a remote graphics processing service, comprising:
   identifying said rendered content has not changed causing:
      a frame capturer to not capture said frames of said rendered content;
      an encoder to not encode said frames of said rendered content; and
      a pre-encoded skip-frame message to be transmitted without requiring any pixel processing.

7. The method recited in claim 6 wherein said frame capturer and said encoder are contained within a graphics processing unit (GPU) communicably coupled to a processor.

8. The method recited in claim 6 wherein said encoder is a hardware ITU-T H.264 encoder.

9. The method recited in claim 6 wherein said skip-frame message is a pre-computed ITU-T H.264 skip message.

10. A graphics server for streaming rendered content of a video stream, comprising:
    a memory configured to store a pre-computed skip-frame message indicative to a client to re-use a previously transmitted frame of said video stream;
    a graphics renderer configured to identify when rendered content has not changed;
    a frame capturer;
    an encoder; and
    a processor, wherein when said graphics renderer identifies said rendered content has not changed, said processor is configured to:
       cause said frame capturer to not capture said frames of said rendered content;
       cause said encoder to not encode said frames of said rendered content; and
       cause said pre-encoded skip-frame message to be transmitted without requiring any pixel processing.

11. The graphics server recited in claim 10 wherein said graphics server is a mobile computing device.

12. The graphics server recited in claim 10 wherein said graphics renderer, frame capturer, and encoder are implemented within a graphics processing unit (GPU) communicably coupled to said processor.

13. The graphics server recited in claim 10 wherein said encoder is a hardware ITU-T H.264 encoder.

14. The graphics server recited in claim 10 wherein said skip-frame message is a pre-computed ITU-T H.264 skip message.

* * * * *